(12) United States Patent
Witzig et al.

(10) Patent No.: US 10,712,201 B2
(45) Date of Patent: Jul. 14, 2020

(54) OPTICAL EMISSION SPECTROMETER WITH CASCADED CHARGE STORAGE DEVICES

(71) Applicant: Bruker AXS GmbH, Karlsruhe (DE)

(72) Inventors: Alexej Witzig, Ettlingen (DE); Martin Van Stuijvenberg, Issum (DE); Rainer Simons, Kranenburg (DE)

(*) Notice: Subject to any disclaimer, the term of this patent is extended or adjusted under 35 U.S.C. 154(b) by 110 days.

(21) Appl. No.: 16/204,541

(22) Filed: Nov. 29, 2018

(65) Prior Publication Data

US 2019/0170580 A1 Jun. 6, 2019

(30) Foreign Application Priority Data

Dec. 1, 2017 (DE) .................. 10 2017 221 719

(51) Int. Cl.
| | |
|---|---|
| *G01J 3/18* | (2006.01) |
| *G01J 3/28* | (2006.01) |
| *G01J 3/20* | (2006.01) |
| *G01J 1/46* | (2006.01) |
| *G01J 3/04* | (2006.01) |
| *G01J 3/443* | (2006.01) |
| *G01J 1/44* | (2006.01) |
| *G01J 3/44* | (2006.01) |

(52) U.S. Cl.
CPC .............. *G01J 3/2803* (2013.01); *G01J 1/46* (2013.01); *G01J 3/04* (2013.01); *G01J 3/18* (2013.01); *G01J 3/20* (2013.01); *G01J 3/443* (2013.01); *G01J 3/4406* (2013.01); *G01J 2001/446* (2013.01); *G01J 2001/4406* (2013.01); *G01J 2003/1842* (2013.01)

(58) Field of Classification Search
CPC .... G01J 3/2803; G01J 3/18; G01J 3/40; G01J 1/46
USPC .................................. 250/226; 356/326, 328
See application file for complete search history.

(56) References Cited

U.S. PATENT DOCUMENTS 4,330,209 A * 5/1982 Hashimoto ........... G01J 3/2803
356/308
7,277,170 B2 10/2007 Fretel et al.
(Continued)

FOREIGN PATENT DOCUMENTS

| DE | 102007027284 | 12/2008 |
|---|---|---|
| DE | 2014104204 U2 | 11/2014 |
| EP | 2517451 B1 | 4/2015 |

*Primary Examiner* — Kevin K Pyo
(74) *Attorney, Agent, or Firm* — Benoit & Côté Inc.

(57) ABSTRACT

An optical emission spectrometer has an excitation device for a sample to be examined, a dispersive element for spectrally decomposing light emitted by an excited sample, a multiplicity of photodiodes, which are arranged such that different spectral components of the emitted, decomposed light are detectable with different photodiodes, and a multiplicity of electronic readout systems for the photodiodes. A respective electronic readout system has a charge storage assembly comprising a plurality of individual charge storage devices, wherein the charge storage devices are interconnectable in cascading fashion, with the result that charges flowing in from an associated photodiode successively fill the charge storage devices. The respective electronic readout system can be used to read the charges of the individual charge storage devices of the charge storage assembly and/or the charges of subsets of the charge storage devices of the charge storage assembly.

15 Claims, 8 Drawing Sheets

(56) References Cited

U.S. PATENT DOCUMENTS

| | | |
|---|---|---|
| 2001/0050332 A1 | 12/2001 | Ukon |
| 2002/0018203 A1* | 2/2002 | Battle .................. G01J 3/02 356/319 |
| 2014/0353472 A1 | 12/2014 | Dierickx |
| 2016/0028986 A1 | 1/2016 | Kobayashi |
| 2016/0360127 A1 | 12/2016 | Dierickx et al. |

* cited by examiner

OPTICAL EMISSION SPECTROMETER WITH CASCADED CHARGE STORAGE DEVICES

BACKGROUND OF THE INVENTION

Field of the Invention

The invention relates to the field of optical emission spectrometers.

Description of the Related Art

An optical emission spectrometer of this type is disclosed in U.S. Pat. No. 7,277,170 B2.

Optical emission spectroscopy is a method of instrumental analysis, with which the chemical composition of the sample can be determined qualitatively and quantitatively. With an appropriate excitation, for example spark emission, the atoms present in the sample are excited to emit characteristic electromagnetic radiation ("light"). The emitted light is spectrally decomposed and measured. The chemical composition of the sample can be determined from the position and intensity of the spectral lines.

In a frequently used type of optical emission spectrometer, a plurality of single channel detectors are arranged on a carrier, in accordance with the expected position of spectral lines to be measured, cf. for example DE 20 2014 104 204 U1. Photomultipliers can be used as single channel detectors due to their high sensitivity with low noise and also their great dynamic measurement range. Disadvantages of this construction are the production costs that increase with the number of the desired spectral lines, and the limitation of the measurable spectral lines due to their installation space inside the spectrometer. In addition, the spectrometer is built for a specific measurement task or application due to the placement of the single channel detectors; later modification is complicated and expensive. A signal in the nearby spectral range of a spectral line cannot be captured. The spectrometer furthermore typically needs to be thermally stabilized so that the position of a detector and of an associated exit slit is maintained.

In a different type of optical emission spectrometer, photodetectors, which are arranged along a line and are produced for example in CMOS technology, cf. U.S. Pat. No. 7,277,170 B2, are used to detect the spectrally decomposed light. Using the often thousand or more photodetectors which are arranged in a row it is possible to record a quasi-continuous spectrum within the covered spectral range. These emission spectrometers are cost-effective and universally suitable for many applications; there is no need to preselect specific spectral lines. However, a disadvantage is a relatively small dynamic measurement range. In the case of spectral lines of clearly different intensity, phased exposure times must be used, which requires conversions and results in inaccuracies. In particular, it is frequently necessary to select different exposure times for an analyte and a reference. Non-linearities in the dynamic measurement range also falsify the measurement results, which in the case of normalizations results in additional errors, even if a linearization calculation has previously been performed. In addition, the signal-to-noise ratio is typically relatively poor. Overall, the determination of intensity ratios and consequently concentration ratios of sample components is difficult.

EP 2 517 451 B1 discloses the ability in a CMOS sensor to set different amplifications for different pixels in advance. Hereby, the dynamic measurement range can be enlarged. In addition, it is possible for a plurality of measurements to be performed quickly in a row, for which in each case dedicated sets of analog storage cells (capacitors) per pixel are set up. The prior specification of the amplification for the different pixels is complicated and difficult when the composition of the sample to be examined, and consequently the location and strength of the occurring spectral lines, are not known. Setting the amplification individually for the pixels of a CMOS sensor is also known from US 2001/0050332 A1.

US 2014/0353472 A1 discloses an image sensor, in which a plurality of charge storage devices per pixel are provided, which can be activated and deactivated in each pixel using a controller. By successively connecting charge storage devices during measurement, it is possible to enlarge the dynamic measurement range.

It is the object of the invention to introduce an optical emission spectrometer, which is universally utilizable and with which the determination of intensity ratios of spectral lines is simplified.

SUMMARY OF THE INVENTION

This object is achieved by an optical emission spectrometer of the type mentioned in the introductory part, which is characterized in that a respective electronic readout system has a charge storage assembly comprising a plurality of individual charge storage devices, wherein the charge storage devices are interconnectable in cascading fashion, with the result that charges flowing in from an associated photodiode successively fill the charge storage devices, and in that the respective electronic readout system can be used to read the charges of the individual charge storage devices of the charge storage assembly and/or the charges of subsets of the charge storage devices of the charge storage assembly.

Provision is made within the context of the invention for a respective charge storage assembly to be provided with a plurality of charge storage devices (for example capacitors), which are interconnected in cascading fashion for the sample measurement.

Arriving charges (charge carriers) initially fill a first enabled charge storage device (or a set of charge storage devices). Once a critical storage level has been reached, for example detectable by way of a voltage level, a further charge storage device is automatically enabled. The newly arriving charges typically flow through, or via, all previously enabled (and correspondingly already filled) charge storage devices onto the newly enabled charge storage device (or set of charge storage devices). If a critical storage level is reached once again, a further charge storage device (or set of charge storage devices) is automatically enabled, and so forth.

Due to the cascade of charge storage devices it is possible to avoid the need to read an entire collected charge of a photodiode (or group of photodiodes) via a single, relatively large charge storage device, which would be associated with a very poor signal-to-noise ratio when reading the collected charge in particular in the case of an entire collected charge that is relatively low compared to the storage capacitance of the individual, large charge storage device. Instead, the entire collected charge is distributed over cascaded charge storage devices, which can be provided with adapted, comparatively small storage capacities. The charge component due to one of the cascaded charge storage devices of an entire collected charge is then generally enlarged as compared to the storage capacitance of the cascaded charge storage device, which gives an improved signal-to-noise ratio when reading the charge storage device.

Provision can be made within the context of the invention for the charge storage devices of the cascade to be read individually for the determination of the collected charge, which results in very precise, low-noise measurement results, but requires a comparatively large connection complexity. Provision can likewise be made within the context of the invention for subsets of the charge storage devices of the charge storage assembly to be formed and read by way of a corresponding connection for the determination of the collected charge. The subsets (in which in each case one or more charge storage devices of the charge storage assembly is/are not contained) can be read with a better signal-to-noise ratio than the charge storage assembly overall. Reading of subsets can be realized with low connection complexity, in particular when the subsets are formed with a successive interconnection of the charge storage devices (for example by way of switches, which are arranged in series, between the charge storage devices).

In the case of small total collected charges (low "signal strength"), a rear portion of the cascaded charge storage devices is not required (that means they do not contain any charge component and therefore do not need to be taken into account for the evaluation), and this rear portion then does not deteriorate the signal-to-noise ratio. In the case of a single reading of the charge storage devices, only the charge components of the charge storage devices which are actually completely or partially filled with collected charge during the sample measurement need to be added; in the case where subsets of the charge storage devices are analysed, typically the charge of that subset of charge storage devices that are actually completely or partially filled with collected charge during the sample measurement is read.

In the case of great total collected charges (large "signal strength"), it is possible for more or even all cascaded charge storage devices to be used, as a result of which a large dynamic measurement range ("dynamic range") can be achieved. In principle, a dynamic measurement range of arbitrary size can be attained by a corresponding number and dimensioning of the charge storage devices in the cascade.

It is possible in the context of the invention for all spectral components of the optical emission spectrum of a sample to be measured simultaneously and with an identical integration time. Within the context of the invention, the measured signal intensities of the different spectral components can then be compared to one another more easily and accurately. The influence of the change over time in the light emission, which in the case of a plurality of successive integration times results in inaccuracies and a poorer reproducibility, can be eliminated with only a single integration time. Conversions due to different integration times are not necessary, and any normalizations are easily possible; it is in particular possible generally for an analyte line and a reference line to be measured simultaneously. Accordingly, highly precise determinations of concentrations or concentration ratios of sample components are also possible. An optical emission spectrometer according to the invention can be universally used; in principle, no knowledge of or adaptation to a strength or location of occurring spectral lines is necessary in advance. To the extent that adaptations to specific measurement tasks are nevertheless required by a user, these adaptations can be limited to software measures.

For the setup, the control and the reading of the charge storage assemblies or of the electronic readout systems in accordance with the invention, the method proposed in US 2014/0353472 A1 can be applied.

Light is here understood to mean UV light and visible light and also infrared light, typically in a wavelength range between 100 nm and 1000 nm, preferably 120 nm to 700 nm.

The sensor unit (sensor arrangement) of the spectrometer (comprising at least the photodiodes and the electronic readout systems) is typically of the CMOS type. The electronic readout systems typically also comprise an amplification.

In the simplest case, each photodiode includes an above-described electronic readout system, in the case of a plurality of measurement transfer gates per photodiode also correspondingly multiple electronic readout systems. In the case of groups of photodiodes that detect the same spectral component, the photodiodes of the group can also utilize a common electronic readout system, in the case of a plurality of measurement transfer gates per photodiode in each case with a common electronic readout system for each measurement transfer gate.

A charge storage device can be embodied for example as a capacitor; it is, however, possible for other structures to be used as charge storage devices, such as partial sections of a MOSFET.

In an exemplary embodiment of a spectrometer according to the invention, provision is made for charge storage devices that are situated towards the rear in a respective charge storage assembly in the cascade to have a greater storage capacitance than charge storage devices that are situated towards the front in the cascade. The front charge storage devices are filled in the cascade temporally before the rear charge storage devices. In the case of only a low signal strength, primarily charge storage devices of low capacitance are therefore filled or partially filled, which increases the accuracy in the determination of the stored amount of charge. On the other hand, in the case of a great signal strength, large amounts of charge can also be stored. The storage capacitance preferably increases from one charge storage device to the next charge storage device in the cascade in each case at least by a factor of 4, preferably at least by a factor of 5, with particular preference by at least a factor of 10. A cascade comprises preferably at least 3, with particular preference at least 4, and with very high preference at least 5 charge storage devices.

Another embodiment provides that the respective electronic readout system can be used to read the charges of subsets of the charge storage devices of the charge storage assembly, wherein a first one of the subsets comprises only the frontmost charge storage device in the cascade, and a next one of the subsets comprises the charge storage device or devices of the preceding subset and additionally the next rear charge storage device in the cascade, and so forth, and that the respective electronic readout system can furthermore be used to read the charge of all the charge storage devices of the charge storage assembly. The selection of the subsets ensures that the subset of charge storage devices of the cascade that is limited to the charge storage devices which are actually completely or partially filled with collected charge is read, and therefore low-noise information relating to the collected charge of the charge storage assembly is obtained. Typically, the charges for all subsets and also the totality of the charge storage devices are read (measured) and initially stored, and as part of an evaluation an ascertainment is performed as to the charge storage device up to which an at least partial filling with charge occurred, and the entire collected charge can then be ascertained by the corresponding measurement (which contains exactly the charge storage devices of the cascade up to said charge storage device) with as little noise as possible.

In one particular embodiment, the excitation device is a spark source. With a spark source, it is particularly easy to excite metallic samples with a high intensity of the emitted light. It should be noted that in the case of spark discharge, the early spectrum (ignition phase) differs from a later spectrum (stable phase), which means that in this case, preferably a plurality of transfer gates are used so as to be able to examine specifically the late spectrum (or alternatively or additionally specifically the early spectrum). Alternatively, a laser, for example, can be provided as the excitation device.

Also provided is an embodiment in which the photodiodes are connected in each case with a measurement transfer gate and a drain transfer gate, wherein in each case an electrical connection to the photodiode can be established and interrupted with the transfer gates, that a said electronic readout system is connected downstream of the measurement transfer gate, and that the drain transfer gate is configured to drain charges from the associated photodiode. The transfer gates act as switches. They can be used to control and in particular temporarily interrupt the measurement times at the measurement transfer gate (for example for "dark intervals" between spark emissions so as to reduce noise). The drain transfer gate can be used to prevent the accumulation of charges during such an interruption to the photodiode that would have to flow through the measurement transfer gate upon reconnection of the measurement transfer gate and thus would undo the effect of the interruption. Typically connected downstream of the drain transfer gate is a reference voltage (for example by means of a drain assembly) to drain the charges from the associated photodiode.

In one development of this embodiment, an electronic control system is present with which the transfer gates can be switched over, such that at a respective time only one of the transfer gates of a respective associated photodiode establishes an electrical connection to the associated photodiode. As a result, a unique association of events/time intervals to the transfer gates can be made.

In another development, the photodiodes are in each case also connected to one or more further measurement transfer gates, and the electronic readout system is connected downstream of a respective further measurement transfer gate. Using a plurality of measurement transfer gates it is possible to temporally decompose a light emission event (such as a spark discharge or a laser flash), wherein individual time sub-intervals of the light emission event or of a light emission phase are assigned to individual measurement transfer gates, and respectively dedicated spectra are determined for the individual time sub-intervals. For example, a first measurement transfer gate can be assigned to the ignition phase of a spark emission and a second measurement transfer gate can be assigned to the stable phase of a spark emission.

Advantageous is also an embodiment, in which the photodiodes are arranged such that an identical spectral component of the emitted, decomposed light is detectable in each case with a group of photodiodes. The signals of the photodiodes of a group can be added up—for creating a spectrum at the latest —, as a result of which a spectrum with a particularly high signal intensity and correspondingly low noise can be obtained. If some of the photodiodes of a group fail, it is additionally still possible to determine the associated spectral component using the remaining photodiodes.

In one development of this embodiment, provision is made that the photodiodes of a group overall have in each case a detection region having an extent in a longitudinal direction of LG and in a transverse direction, perpendicular to the longitudinal direction, of QG, with $LG \geq 12*QG$, preferably $LG \geq 20*QG$, wherein the photodiodes of the group divide the detection region in the longitudinal direction. In the case of an elongate detection region, it is possible due to a division of the detection region in the longitudinal direction to a plurality of photodiodes to shorten the diffusion path of charge carriers up to a site of a charge pickup, as a result of which photons that have produced the charge carrier can be assigned more accurately in terms of time (for example when using measurement transfer gates).

Additionally provided is an embodiment in which an aperture device is present, with which it is possible to shade some of the detection region of one or more photodiodes, in particular wherein the detection region has an extent in a longitudinal direction of LP and in a transverse direction, perpendicular to the longitudinal direction, of QP, with $LP \geq 12*QP$, preferably $LP \geq 20*QP$. Due to the shading, the detection region of a respective photodiode is more accurately defined, in particular shortened, such that diffusion paths of a triggered charge (for example an electron) to a site of the charge pickup (measurement transfer gate) are set more accurately, in particular shortened. Triggered charges can then be assigned more accurately in terms of time. To shorten the diffusion time, the shading can be effected at an end that is remote from a charge pickup. However, shading can also be effected from a side of a charge pickup, in particular in a detection region of a group of two photodiodes having charge pickups that are situated on the outside.

Also part of the present invention is a method for operating an optical emission spectrometer according to the invention, which is provided with a measurement transfer gate and a drain transfer gate, characterized in that a pulsed excitation of the sample to be examined is effected using the excitation device such that a plurality of light emission phases and dark phases follow one another in alternation, in that in each case the measurement transfer gate establishes an electrical connection to the associated photodiode at least during part of a respective light emission phase, and in that in each case the drain transfer gate establishes an electrical connection to the associated photodiode in dark phases. As a result, noise occurring during the dark phase at the photodiode can be kept away from a spectrum that is produced with the measurement transfer gate, as a result of which the signal-to-noise ratio of the spectrum is improved.

Included is a variant of the method according to the invention, in which in each case the measurement transfer gate establishes an electrical connection to the associated photodiode only during a part of a respective light emission phase, wherein said part excludes an earliest time interval of the light emission phase, in particular wherein an excitation of the sample is effected by way of spark discharge. An earliest time interval of a light emission phase, for example the ignition phase of a spark discharge, is typically less characteristic for the material of the sample to be examined. By excluding this early time interval, the quality and informative content of a spectrum recorded with the measurement transfer gate can be improved.

In a different, advantageous variant, provision is made that the photodiodes are in each case also connected to one or more further measurement transfer gates, and a said electronic readout system is connected downstream of a respective further measurement transfer gate, that in each case the measurement transfer gate establishes an electrical connection to the associated photodiode only during part of a respective light emission phase, that in each case one or more further measurement transfer gates establish an electrical connection to the associated photodiode during one or more further parts of a respective light emission phase, and that in each case the drain transfer gate establishes an electrical connection to the associated photodiode in dark phases. In this variant, the light emission phase or a corresponding light emission event is temporally decomposed, wherein individual time sub-intervals ("parts") of the light emission phase are assigned to individual measurement transfer gates, and respectively dedicated spectra are determined for the individual parts. For example, a first measurement transfer gate can be assigned to the ignition phase of a spark emission and a second measurement transfer gate can be assigned to the stable phase of a spark emission. It is thus possible to spectrally track the time profile of a light emission event, as a result of which additional findings relating to the sample that is examined can be gathered.

Also provided is a variant in which the transfer gates of all photodiodes are synchronously switched over during the measurement of the sample. In this variant, all measurement transfer gates of the different photodiodes are opened and closed at the same time (i.e. are switched to be conducting and non-conducting at the same time), furthermore, all further measurement transfer gates (possibly of the same order) of the different photodiodes are opened and closed at the same time, and furthermore all drain transfer gates of the different photodiodes are opened and closed at the same time, where present. The different types (and possibly orders) of transfer gates have a temporal offset with respect to one another, typically such that always exactly one type (or possibly order) of transfer gate at a respective photodiode is open. Due to synchronization, it is possible to achieve identical integration times for all spectral components, as a result of which the signals of the different spectral components become easier to compare.

Likewise part of the present invention is the use of an above-described optical emission spectrometer according to the invention, wherein a sample is measured with the spectrometer, said sample having spectral lines in the detected light which differ in terms of their integrated intensity by at least a factor $10^5$, preferably at least by a factor $10^6$. The spectrometer according to the invention can be used to easily set up a corresponding dynamic measurement range, such that a qualitatively good spectral measurement of the sample can be performed.

Further advantages of the invention can be gathered from the description and the drawings. Similarly, the previously mentioned features and those which will be explained below can be used in accordance with the invention in each case individually by themselves or with others in any desired combinations. The embodiments shown and described should not be understood to constitute an exhaustive list, but rather have an exemplary character for explaining the invention.

BRIEF DESCRIPTION OF THE DRAWINGS

The invention is illustrated in the drawing and will be explained in more detail with reference to exemplary embodiments. In the drawings.

DETAILED DESCRIPTION

Figure 1:
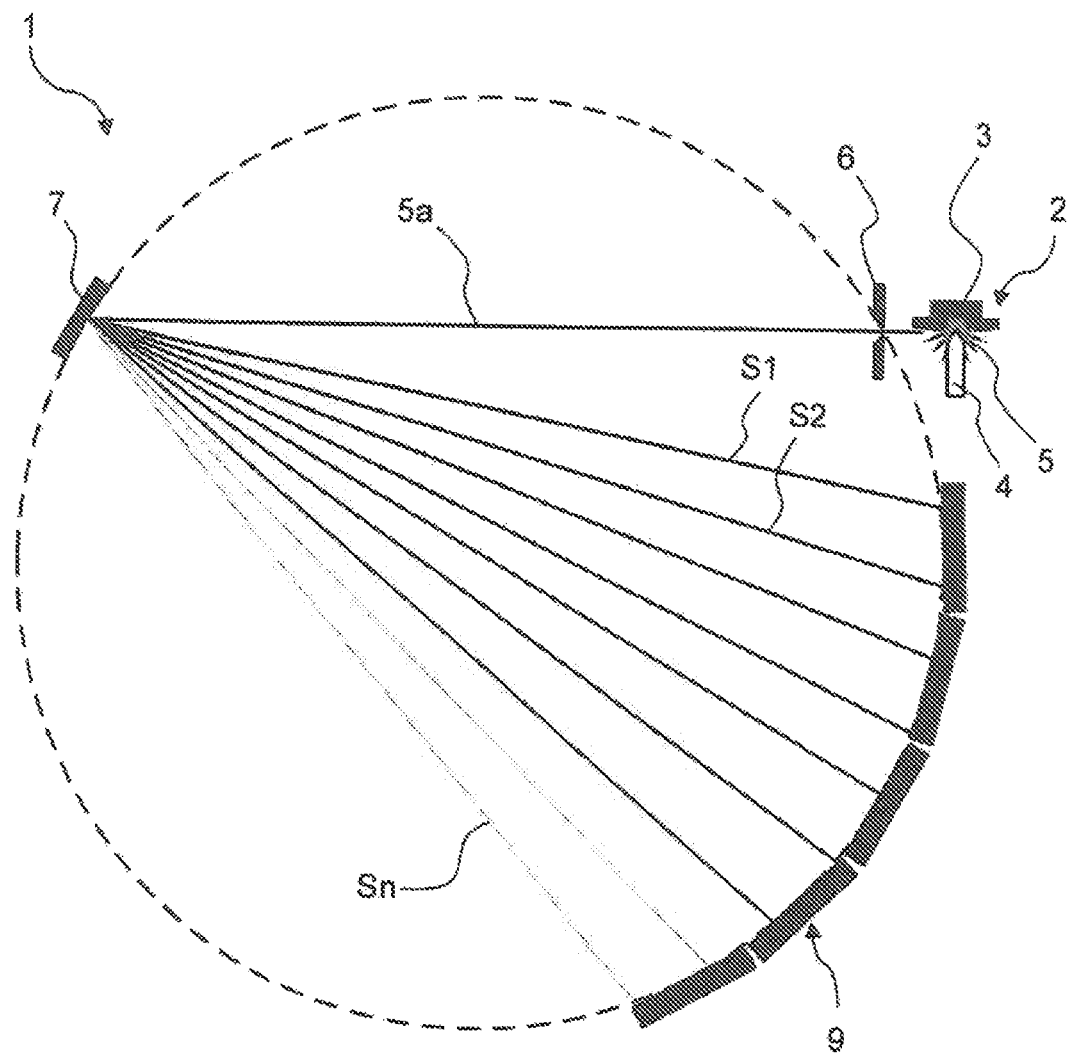
FIG. 1 shows a schematic illustration of an embodiment of an optical spectrometer according to the invention.

FIG. 1 shows an embodiment of an optical emission spectrometer 1 according to the invention. The spectrometer 1 comprises an excitation device 2, in the present case what is known as a spark stand, to which a pulsed DC voltage is applied between a sample 3, in the present case a metallic sample which is used as a first electrode, and a mandrel-shaped counter element 4, which is used here as a second electrode. With each DC voltage pulse, a spark discharge occurs between the two electrodes, wherein material is separated from the sample 3 and atoms of the sample material are transformed into a plasma state. Upon re-filling of the electron shells of the atoms, a characteristic emission of light 5 occurs. Typically, between 100 and 2000 spark discharges (also referred to as "sparks") per second are produced. A typical voltage of the DC voltage is between 3 kV and 10 kV, typically around 5 kV. The individual DC voltage pulse has a length of typically 50 µs to 250 µs, typically around 100 µs.

Some of the emitted light 5 passes through an entrance slit 6; the corresponding light beam 5a of the emitted light 5 hits on a dispersive element 7, here a reflective dispersion grating, which spectrally decomposes the light beam 5a. Different spectral components S1-Sn are reflected in different directions and hit a sensor arrangement 9.

The sensor arrangement 9 here comprises five sensor substructures, which are typically set up on different circuit boards. The sensor arrangement 9 is typically of a CMOS type.

The sensor arrangement 9 comprises in particular photodiodes which face the dispersive element and detect the different spectral components S1-Sn of the reflected light (not illustrated in more detail in FIG. 1, but cf. in this respect FIG. 2, FIG. 3); the incident light then produces charge carriers at a pn-transition, which cause a current flow when voltage is applied. The sensor arrangement 9 furthermore comprises charge storage assemblies, with which charge carriers flowing in from the photodiodes can be stored (not illustrated in more detail, but cf. in this respect FIG. 4, FIG. 5 and FIG. 7).

Figure 2:
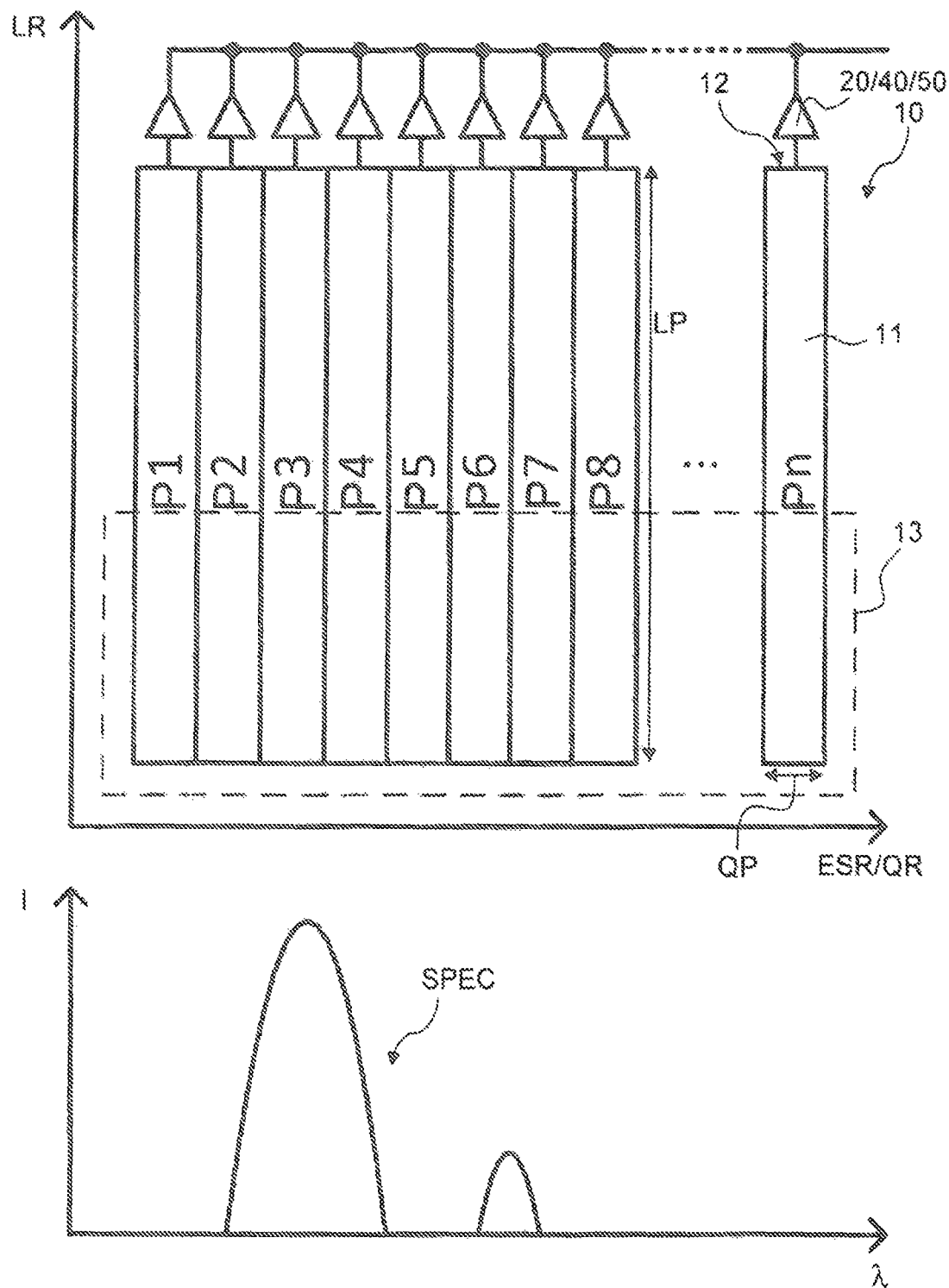
FIG. 2 shows a schematic illustration of a photodiode arrangement for the invention, in each case with a photodiode for a spectral component of a spectrum that is to be recorded.

FIG. 2 schematically shows a photodiode arrangement 10, as can be installed in a sensor arrangement, for example the sensor arrangement of FIG. 1. The photodiode arrangement 10 comprises a multiplicity (here n) of photodiodes P1-Pn, which are arranged in a line along a direction of extent ESR of the sensor arrangement (note that the direction of extent ESR may be curved, for example approximately along an arc, cf. the dashed arc of a circle in FIG. 1, on which the sensor arrangement is arranged). Every photodiode P1-Pn is assigned a specific spectral component in the emission spectrum of the sample, corresponding to its position in the direction of extent ESR and the width QP of its detection region 11 in the transverse direction QR, which is approximately parallel to the direction of extent ESR.

By way of example, drawn in the bottom part of FIG. 2 is a simple spectrum SPEC of a sample wherein drawn towards the right is an emission wavelength λ (which can be assigned to a corresponding position in the photodiode arrangement 10 along the direction of extent ESR), and drawn upwards is an intensity I. In the example shown, the spectral line on the left would primarily produce intensity in the photodiode P3 and some intensity in the photodiodes P2 and P4; the spectral line on the right would primarily produce intensity in the photodiodes P6 and P7. It can be seen that, in practice, a sensor arrangement can typically have more than 1000, frequently more than 3000, and certainly also more than 5000 channels (here correspondingly photodiodes/spectral components), and a spectral line typically produces noticeable intensity over five or more, often ten or more channels.

The photodiodes P1-Pn have a length LP of their detection region 11 in a longitudinal direction LR perpendicular to the direction of extent ESR, which is here approximately twelve times the size of the width QP. This can have the result that charge carriers which are produced near one end (here upper end) of the photodiodes P1-Pn close to charge pickups 12 have a significantly shorter diffusion path to the charge pickup 12 than charge carriers which are produced close to an opposite end (here bottom end). As a result, a temporal assignment of charge carriers produced can become difficult. In order to approximately standardize (here keep short) diffusion times of charge carriers to the charge pickup 12, a portion (here bottom portion) of the detection region 11 of the photodiodes P1-Pn can be shaded by an aperture device 13. The aperture device 13 preferably has a removable design and is used only when the temporal resolution of the charge carriers is important so as not to lose signal intensity unnecessarily.

Connected downstream of the charge pickups 12 is here in each case a switch unit 20 or 40 or 50 (cf. in this respect for example FIG. 4, FIG. 5 or FIG. 7) in order to convert the charge carrier flow produced by the respective photodiode P1-Pn into an easily measurable output signal.

Figure 3:
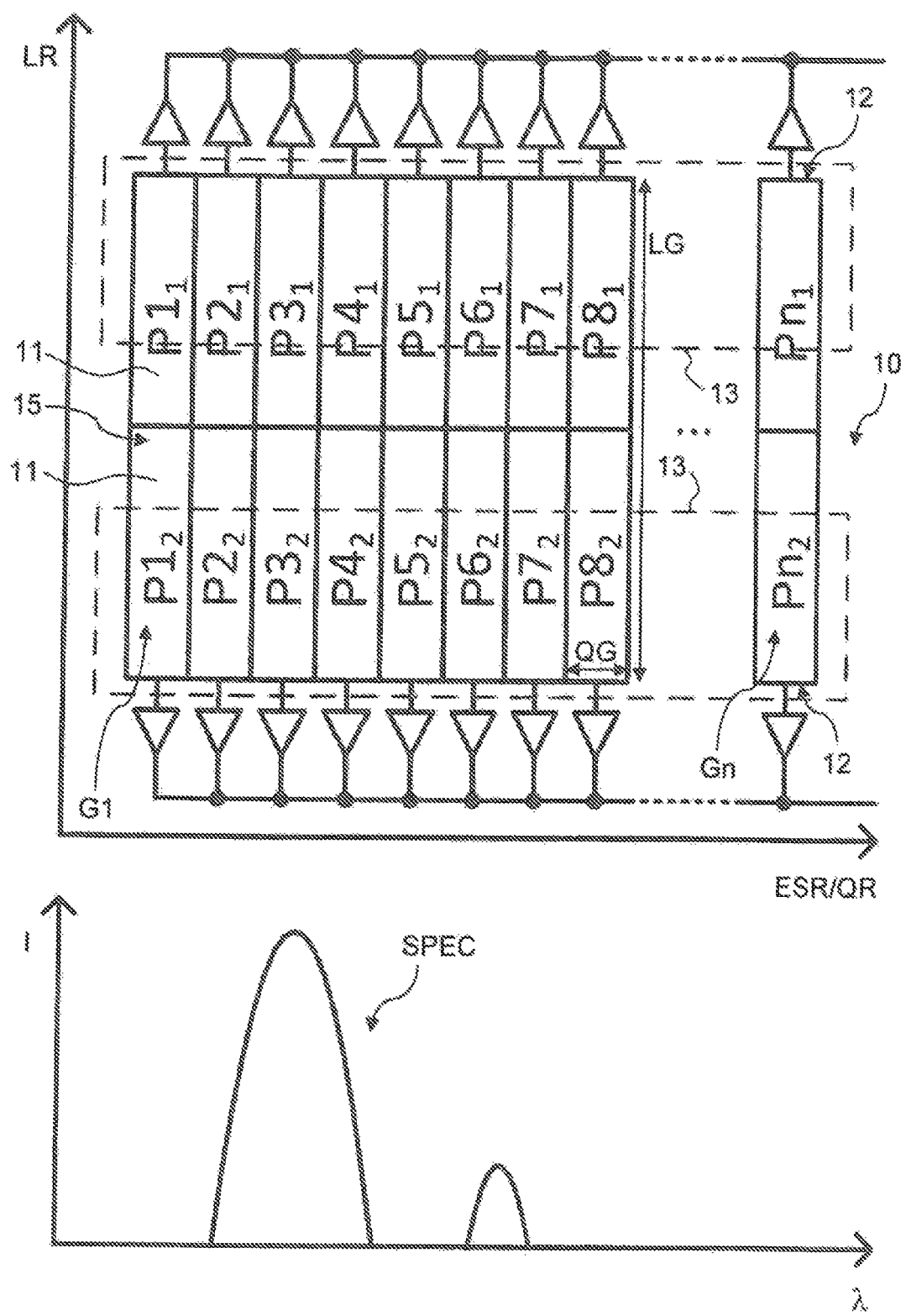
FIG. 3 shows a schematic illustration of a photodiode arrangement for the invention, in each case with a group of two photodiodes for a spectral component of a spectrum that is to be recorded.

It should be noted that the direction of extent ESR (and consequently also the transverse direction QR) and the longitudinal direction LR are both in each case approximately perpendicular to the propagation direction of the light that is to be detected (in FIG. 3, top, perpendicular to the drawing plane).

FIG. 3 shows a photodiode arrangement 10 similar to the photodiode arrangement of FIG. 2, and consequently only the significant differences will be explained here. In this type of construction, in each case one group G1-Gn of here two photodiodes is provided for each spectral component (cf. S1-Sn in FIG. 1) or channel (in alternative embodiments, three or even more photodiodes per group may be provided). The first group G1 comprises for example the photodiodes $P1_1$ and $P1_2$, which are arranged at the same position in the direction of extent ESR of the sensor arrangement but next to one another in the longitudinal direction LR. The detection region 15 of a total group G1-Gn comprises the detection regions 11 of the respectively associated photodiodes (for example of $P1_1$ and $P1_2$ in the group G1). In the exemplary embodiment shown, the respective extent LG of a group G1-Gn in the longitudinal direction LR is approximately twelve times the respective extent QG in the transverse direction.

By dividing the respective group G1-Gn into here two photodiodes (such as $P1_1$ and $P1_2$ in group G1), the maximum diffusion length of charge carriers produced within a group G1-Gn to the respective charge pickup 12 can be halved; accordingly, a temporal uncertainty of the charge carrier production is also halved, compared to the type of construction of FIG. 2.

In addition, a further standardization of the diffusion times of charge carriers can be attained by a here two-part aperture device 13, with which here the respective ends of the detection regions 11 near the charge pickups 12 are covered so as to establish a continuous, non-covered portion of the detection region 15 of the respective group G1-Gn.

The signals of the two photodiodes of a group can be added up after amplification before further storage and evaluation, or can be stored and further processed separately and be combined only for a spectrum (not illustrated in more detail).

Figure 4:
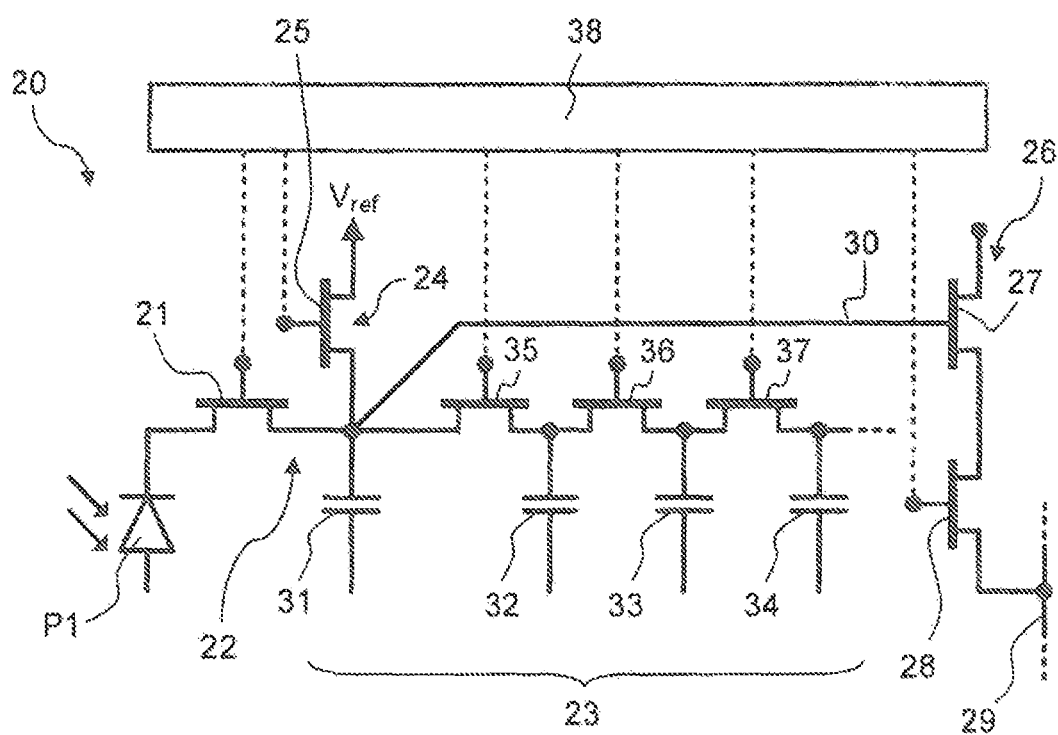
FIG. 4 shows a schematic illustration of a switch unit for a photodiode for the invention, having a measurement transfer gate.

FIG. 4 shows a switch unit 20 for the invention, with which the charge carriers flowing in from a photodiode P1 can be evaluated. Connected downstream of the photodiode P1 is a measurement transfer gate 21, by way of which the photodiode P1 is electrically connected to a downstream electronic readout system 22 or can be disconnected therefrom. The measurement transfer gate 21 is a switch which is embodied here in the form of a MOSFET.

The electronic readout system 22 comprises a charge storage assembly 23 having a multiplicity of charge storage devices, of which, by way of example, four charge storage devices 31-34 are drawn in FIG. 4; typically, five or six charge storage devices are provided in a charge storage assembly 23. The charge storage devices 31-34 are embodied here in the form of capacitors. The charge storage devices 31-34 in the embodiment shown are connected in parallel to the measurement transfer gate 21, wherein in each case a switch 35, 36, 37, which is embodied in the form of a MOSFET, is arranged between the individual charge storage devices 31-34. The switches 35, 36, 37 here form a series connection.

The electronic readout system 22 furthermore comprises a reset assembly 24, which is likewise connected to the measurement transfer gate 21. The reset assembly 24 comprises a switch 25, which is embodied in the form of a MOSFET and connected to a reference voltage Vref. The photodiode P1 (in the case of a conducting measurement transfer gate 21) and the charge storage devices 31-34 can be reset hereby to the reference voltage Vref, for example at the start of a measurement, in particular in order to remove charge carriers which have collected at the photodiode P1 and charges of a previous measurement.

The electronic readout system 22 here furthermore comprises an output stage 26, with which the charge storage devices 31-34 can be read via a pickup line 30. A first MOSFET 27 converts a charge from the first charge storage device 31 or from a larger subset of the charge storage devices 31-34 into a voltage (see also further below in this respect). The associated voltage signal can be applied by way of a further MOSFET 28 to a read line (bus) 29, which leads to an A/D converter (not illustrated in more detail) of a spectroscopy system having data memories.

The measurement transfer gate 21 and the switches/MOSFETs of the electronic readout system 22 can be controlled via an electronic control system 38. The electronic control system 38 is set up such that the switches 35-37 between the charge storage devices 31-34 are switched to conducting in temporal succession during a measurement, with the result that charge carriers flowing from the photodiode are initially stored only in the first (frontmost) charge storage device 31, and after the switch 35 has also been switched to conducting, are also stored in the second charge storage device 32, and after switching the switch 36 to conducting, are also stored in the third charge storage device 33, and so forth ("cascade of charge storage devices").

The electronic control system 38 preferably in this respect evaluates a current filling level of the already turned-on charge storage devices 31-34, and the next charge storage device is automatically turned on (not illustrated in more detail) only when a limit value is exceeded (at which the already turned-on charge storage devices are substantially "full"). In the embodiment shown, the conductance of a switch 35-37 is dependent on the voltage of the immediately preceding charge storage device 31-34. If a threshold voltage is not exceeded, the switch 35-37 to the next charge storage device 31-34 is totally disconnected. When the threshold is exceeded, the switch 35-37 conducts only to the extent that the amount of charge that flows to the next charge storage device 31-34 is exactly such that the threshold voltage at the immediately preceding charge storage device is no longer exceeded ("overflow of charge" into the next charge storage device in the cascade).

In the embodiment introduced here, the storage capacitance increases in each case tenfold from charge storage device 31-34 to charge storage device 31-34 from the front (at charge storage device 31) to the rear (at charge storage device 34) in the charge storage assembly 23 (in other types of construction, it is also possible for example for an exponential increase to occur in each case). For example, the charge storage device 31 has a capacitance of 1 fF, the charge storage device 32 has a capacitance of 10 fF, the charge storage device 33 has a capacitance of 100 fF, and the charge storage device 34 has a capacitance of 1000 fF.

For reading the collected charge of the charge storage assembly 23, first (in the case of an electrically disconnecting switch 35 to the subsequent charge storage device 32) the charge at the frontmost charge storage device 31 is read via the pickup line 30. Next, the switch 35 to the next charge storage device 32 is switched to be fully conducting (in the case of a disconnecting switch 36 to the subsequent charge storage device 33); a voltage equalization between the charge storage devices 31, 32 may occur here. The charge of the subset of charge storage devices consisting of the charge storage devices 31, 32 is now read via the pickup line 30. Next, the switch 36 is switched to be fully conducting, and the charge of the subset comprising the charge storage devices 31, 32, 33 is read, and so forth. Finally, the charge of the totality of all charge storage devices 31-34 of the charge storage assembly 23 with all the connecting switches 35-37 in the fully conducting state is also read via the pickup line 30. When reading, the switches 35-37 are thus controlled sequentially to form the subsets. All measurement values of the read charges are stored. If in the preceding charge collection by way of the charge storage assembly 23 charge storage devices that are situated towards the rear (for example the charge storage device 34) were not needed or did not receive any charge, this is discernible from the no longer increasing read charge of the subsets after taking into account those rear charge storage devices. With the measurement of the charge of the subset at which the charge increased last, the entire collected charge of the charge storage assembly 23 was determined with an optimized signal-to-noise ratio. If desired, it is possible for the charge of an individual charge storage device 31-34 to be additionally determined for example by calculating the difference of the charge of the subset at which the former first belonged to the subset and the charge of the preceding subset.

It should be noted that in an alternative embodiment (which is not illustrated), it is also possible for a pickup line from each charge storage device 31-34 of the charge storage assembly 23 to the output stage 26 to be provided, and in each pickup line a MOSFET switch is also provided to individually switch the charge storage devices 31-34 to the output stage 26 (in the case of non-conducting switches 35-37). Thereby, each charge storage device 31-34 can be individually read. The entire, collected charge can then be determined by way of addition of the charges of the charge storage devices which have also actually received charge in the course of the preceding charge collection. It is hereby likewise possible to attain overall a good signal-to-noise ratio in the determination of the entire, collected charge of the charge storage assembly 23.

The switch unit 20 illustrated in FIG. 4 is configured to integrate continuously over time charge carriers produced at the photodiode. At the start of the measurement, the charge carriers can be reset via the reset assembly 24, and then integration is performed until the measurement transfer gate 21 is switched to be non-conducting. The switch unit 20 is in particular suited to analyse a single spark of a spark discharge. The measurement transfer gate 21 is then switched to be conducting only for the duration of the spark that is to be analysed (after a reset immediately prior thereto with the reset assembly 24).

Figure 5:
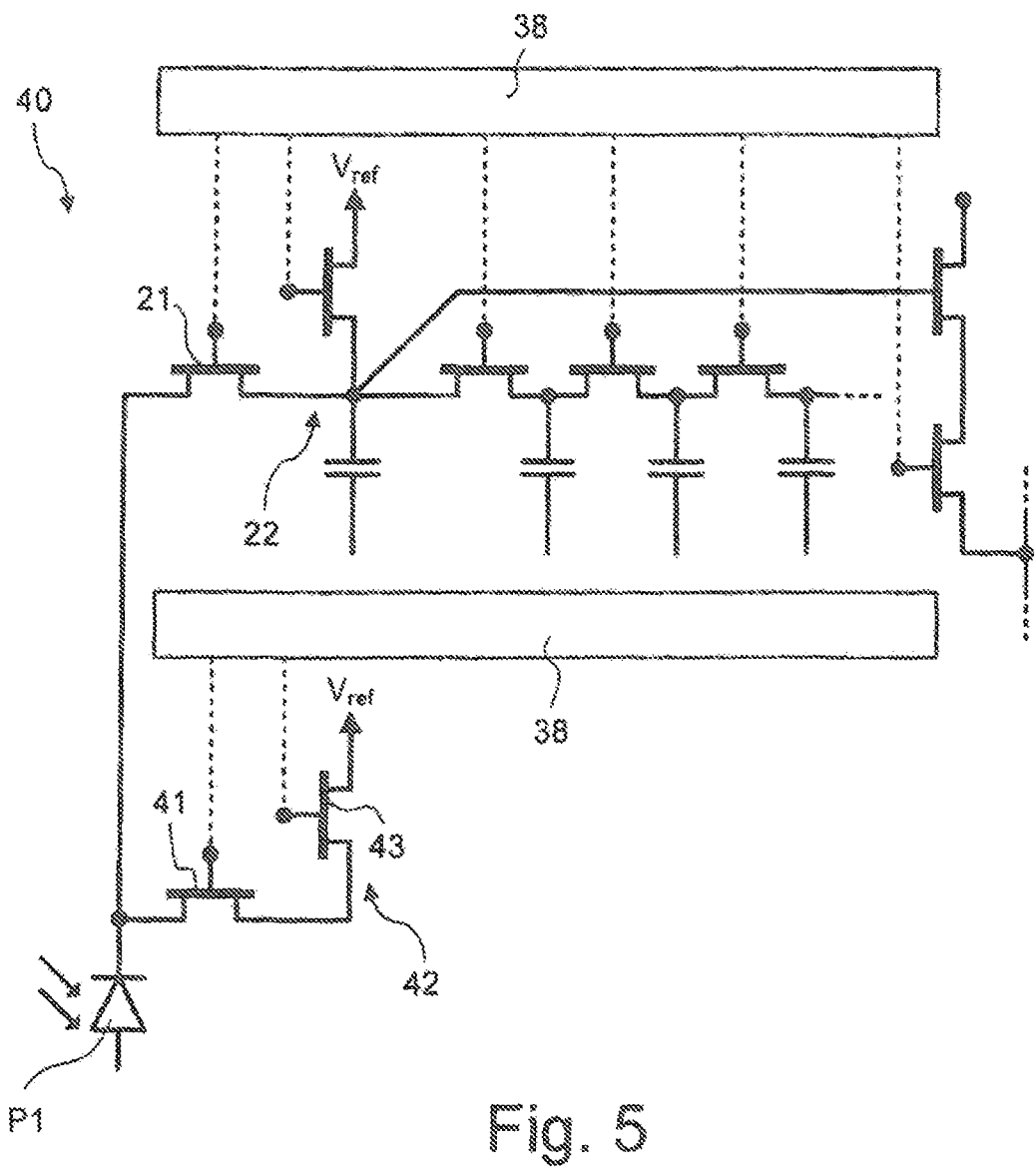
FIG. 5 shows a schematic illustration of a switch unit for a photodiode for the invention, having a measurement transfer gate and a drain transfer gate.

FIG. 5 shows a switch unit 40 for the invention, with which the charge carriers flowing in from a photodiode P1 can be evaluated. Primarily the differences with respect to FIG. 4 will be explained. Parallel connected to the photodiode P1 are here a measurement transfer gate 21 with electronic readout system 22 connected downstream, as already illustrated in FIG. 4, and in addition a drain transfer gate 41.

The drain transfer gate 41 is a switch which is embodied here in the form of a MOSFET. The drain transfer gate 41 can be used to drain charges produced by the photodiode P1 without storage. To this end, a drain assembly 42 is connected downstream of the drain transfer gate 41. The drain assembly 42 comprises a switch 43, which is embodied here in the form of a MOSFET and connected to a reference voltage Vref. The drain transfer gate 41 and the switch 43 are likewise controlled via the electronic control system 38.

Figure 6:
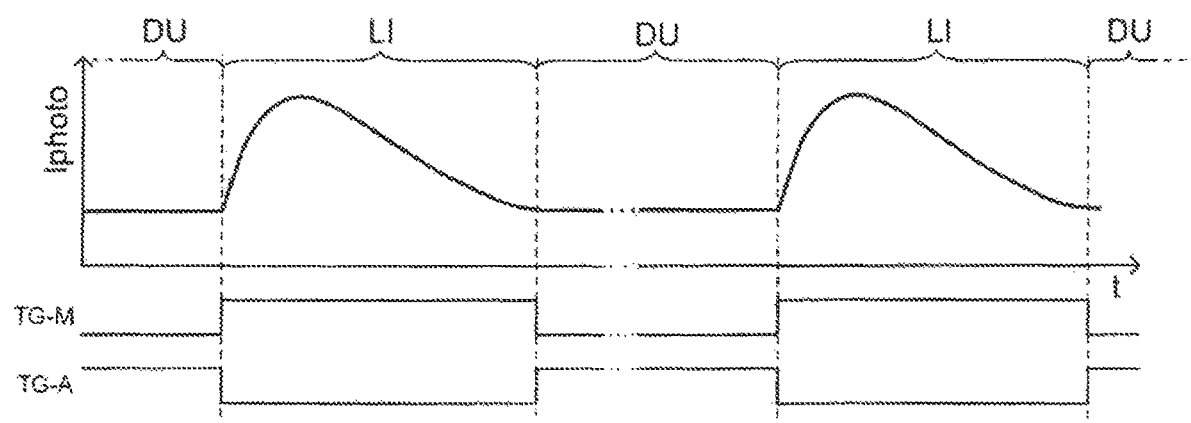
FIG. 6 shows a schematic illustration of the time profile of photo current and switching state of the transfer gates in the switch unit of FIG. 5.

FIG. 6 illustrates how the two transfer gates are switched in terms of time as compared to a photo current Iphoto of the photodiode; the time t during a measurement is plotted towards the right. During a measurement, light emission phases LI and dark phases DU alternate. Dark phases DU for example correspond to time periods between two spark emissions at a spark stand (cf. in this respect FIG. 1). A photo current Iphoto produced at the photodiode traverses a respective maximum during a light emission phase LI. During dark phases DU, a low but not negligible photo current Iphoto is present. The photo current Iphoto from dark phases DU contains no information relating to the sample that is being examined and for this reason represents merely noise for a characteristic spectrum of the sample material that is to be established. The information relating to the sample can be found in the photo current Iphoto from the light emission phases LI. For this reason, a spectrum of the sample of the photo current Iphoto should not be used during a dark phase DU.

Therefore, the transfer gates are switched such that, during the dark phases DU, the drain transfer gate is conducting, i.e. electrically connecting (control signal TG-A high), such that the photo current Iphoto during these times can drain without storage (for a conducting switch 43 in FIG. 5); during these times, the photodiode is simply set to the reference voltage by way of the drain assembly. The measurement transfer gate is not conducting in the dark phases DU, i.e. electrically disconnecting (control signal TG-M low).

By contrast, the measurement transfer gate is conducting during light emission phases LI, i.e. electrically connecting (control signal TG-M high), such that the charge carriers of the photo current Iphoto are stored in the cascaded charge storage assembly of the electronic readout system behind the measurement transfer gate. By contrast, the drain transfer gate is not conducting, i.e. electrically disconnecting (control signal TG-A low). A measurement typically comprises a multiplicity of light emission phases LI (usually 100 or more), over which integration is performed with the electronic readout system or the charge storage assembly behind the measurement transfer gate until, finally, at the end of the measurement, the entire, collected charges are read.

The transfer gates are typically controlled synchronously with the excitation of the sample material, for example a DC pulse at a spark stand or the light pulse of a laser.

Figure 7:
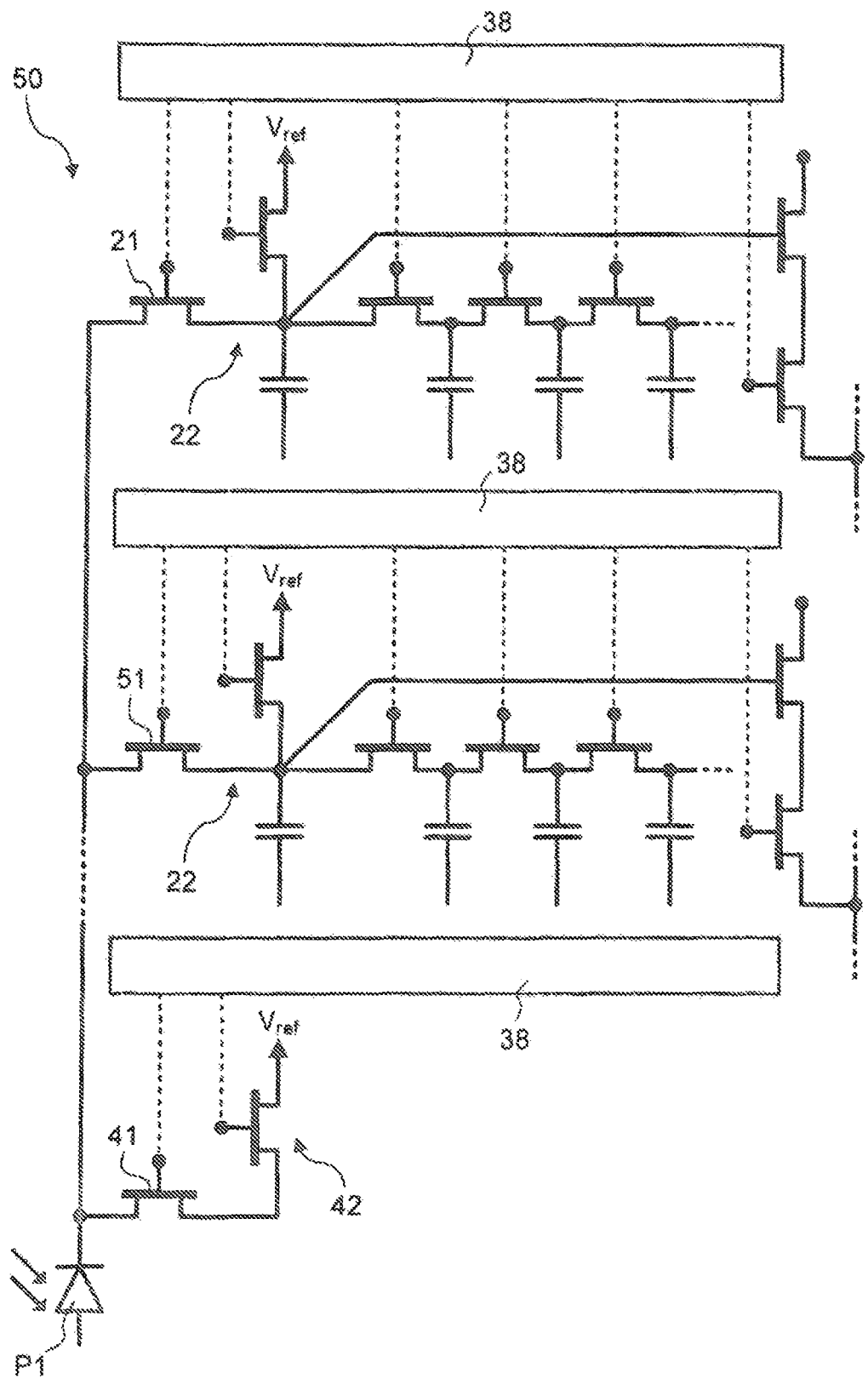
FIG. 7 shows a schematic illustration of a switch unit for a photodiode for the invention, having a measurement transfer gate, a further measurement transfer gate and a drain transfer gate.

FIG. 7 shows a switch unit 50 for the invention, with which the charge carriers flowing in from a photodiode P1 can be evaluated. Primarily the differences with respect to FIG. 5 will be explained. Connected in parallel to the photodiode P1 are here a measurement transfer gate 21 having an electronic readout system 22 connected downstream, as already illustrated in FIG. 4, a further measurement transfer gate 51 with an electronic readout system 22 connected downstream, as has likewise already been illustrated in FIG. 4, and furthermore a drain transfer gate 41 with a drain assembly 42 connected downstream, as has already been illustrated in FIG. 5. All transfer gates 21, 41, 51 and switches/MOSFETs are controlled via the electronic control system 38.

Figure 8:
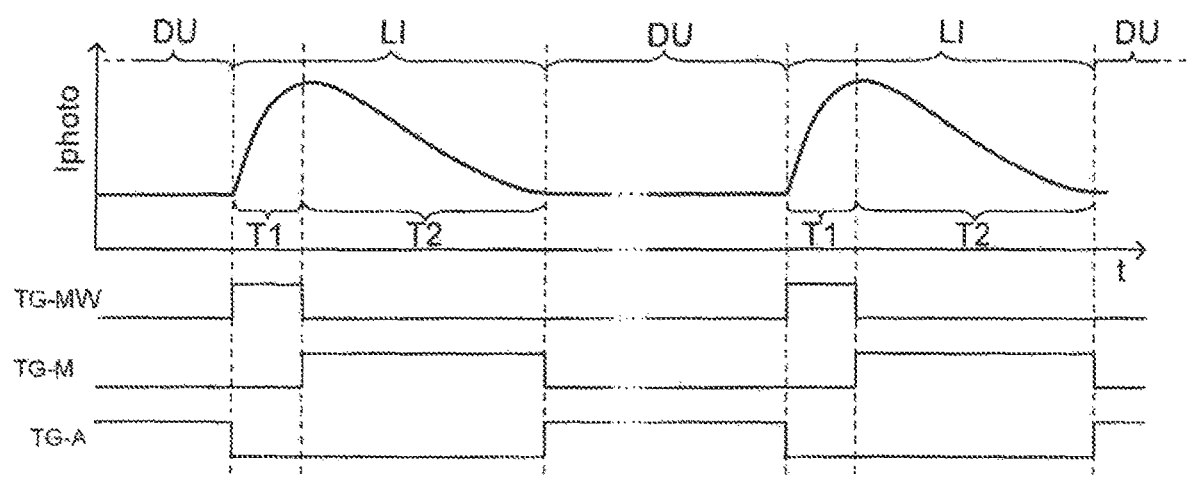
FIG. 8 shows a schematic illustration of the time profile of photo current and switching state of the transfer gates in the switch unit of FIG. 7.

FIG. 8 illustrates how the three transfer gates are switched in terms of time as compared to a photo current Iphoto of the photodiode; the time t during a measurement is plotted towards the right. Primarily the differences with respect to FIG. 6 will be explained. During a measurement, light emission phases LI and dark phases DU again alternate. During the dark phases DU, the photo current Iphoto of the photodiode can drain via the conducting drain transfer gate, (control signal TG-A high); by contrast, the two measurement transfer gates are non-conducting, i.e. electrically disconnecting (control signals TG-M and TG-MW low).

The light emission phases LI are here divided in each case into two parts T1, T2. During a respectively first (chronologically early) part T1, in each case the further measurement transfer gate is conducting (control signal TG-MW high) and the other transfer gates are non-conducting (control signals TG-M and TG-A low). During a respectively second (chronologically late) part T2, in each case the measurement transfer gate is conducting (control signal TG-M high) and the other transfer gates are non-conducting (control signals TG-MW and TG-A low).

Accordingly, it is possible with the signals of the different channels of a sensor arrangement to record an optical emission spectrum of the early time intervals of the light emission phases LI in each case by way of the cascaded charge storage assemblies of the further measurement transfer gates, and to record an optical emission spectrum of the late time intervals of the light emission phases LI in each case by way of the cascading charge storage assemblies of the measurement transfer gates. In the case of a spark emission, the emission spectrum obtained from the late time intervals is usually particularly informative for the material of an examined sample.

It should be noted that it is also possible to use a plurality of further measurement transfer gates in order to be able to examine the profile of a light emission phase in even more finely temporally decomposed fashion (not illustrated in more detail, but cf. the dashes at the line proceeding from the photodiode P1 to the transfer gates 21, 41, 51 in FIG. 7); the further measurement transfer gates then form "orders". For example, for a subdivision of a light emission phase into three parts, a measurement transfer gate and two further measurement transfer gates (that is to say a further, first-order measurement transfer gate and a further, second-order measurement transfer gate) are required.

In an exemplary optical emission spectrometer in accordance with the invention, 3500 pixels (channels, spectral components) or more, with particular preference approximately 7000 pixels, are used in a CMOS line-scan sensor. A pixel preferably has a height of between 100 μm and 300 μm, preferably approximately 200 μm, and a width of between 3 μm and 10 μm, preferably approximately 4 μm. A pixel is preferably designed as a 4-transistor (4T) photodiode pixel with minimum noise (read noise) of 4e or better. Each pixel is preferably provided with three transfer gates, with particular preference with a switch time of 10 μs or less. The transfer gates are assigned for example to a spark ignition phase (first measurement region), a time with a stable plasma (which is characteristic for a spectral line) (second measurement region) and a dead time until the next spark (for immediate drain of photoelectrons which are not of interest); the switchover of the transfer gates is preferably performed for each pulse in the measurement pulse sequence applied to the sample. The switchover can be optimized, if desired, for a specific spectral line. The measurement transfer gates for the two measurement regions are connected to cascaded charge storage devices, the storage capacitance of which in the cascade preferably increases in each case by a factor of two or more from charge storage device to charge storage device. Preferably, at least five, with particular preference exactly five or six, charge storage devices are used in a cascade. The storage capacitance of the largest charge storage device in a cascade can be, for example, 60 million electrons or more. Due to automatic overflow into the next charge storage device in the cascade during integration, presetting of required charge storage devices is not necessary. UV radiation or VUV radiation can also be detected at the sensor arrangement without fluorescence coating due to preferably applied "backside thinning (BST)" or "frontside thinning (FST)". The maximum frame rate at the sensor is preferably at least 1 kHz. Preferably, it is possible for all pixel data to be read and stored between two light pulses even at maximum frequency of the pulse source. The sensor arrangement can be manufactured in accordance with the chip-on-board concept, in which a silicon die is directly mounted on a printed circuit board having the necessary supply electronics.

LIST OF REFERENCE SIGNS

1 optical emission spectrometer
2 excitation device 3 sample
4 counter element
5 light
5a light beam
6 entrance slit
7 dispersive element
9 sensor arrangement
10 photodiode arrangement
11 detection region (photodiode)
12 charge pickup
13 aperture device
15 detection region (group of photodiodes)
20 switch unit
21 measurement transfer gate
22 electronic readout system
23 charge storage assembly
24 reset assembly
25 switch
26 output stage
27 MOSFET
28 MOSFET
29 read line (bus)
30 pickup line
31-34 charge storage device
34-37 switch
38 electronic control system
40 switch unit
41 drain transfer gate
42 drain assembly
43 switch
50 switch unit
51 further measurement transfer gate
DU dark phase
ESR direction of extent (sensor arrangement)
G1-Gn group of photodiodes of the spectral component 1–n
I intensity (spectrum)
Iphoto photo current
LG extent of the detection region of a group of photodiodes in the longitudinal direction
LI light emission phase
LP extent of the detection region of a photodiode in the longitudinal direction
LR longitudinal direction
QG extent of the detection region of a group of photodiodes in the transverse direction
QP extent of the detection region of a photodiode in the transverse direction
QR transverse direction
P1-Pn photodiode of the spectral component 1-n
$P1_i$-$Pn_i$ photodiode i in a group of the spectral component 1-n
SPEC spectrum
S1-Sn spectral components
t time
TG-A control signal (drain transfer gate)
TG-M control signal (measurement transfer gate)
TG-MW control signal (further measurement transfer gate)
T1 first/early part (light emission phase)
T2 second/late part (light emission phase)
λ emission wavelength (spectrum)

The invention claimed is:

1. An optical emission spectrometer comprising:
an excitation device for a sample to be examined;
a dispersive element for spectrally decomposing light emitted by an excited sample;
a multiplicity of photodiodes (P1-Pn, $P1_i$-$Pn_i$), which are arranged such that different spectral components (S1-Sn) of the emitted, decomposed light are detectable with different photodiodes (P1-Pn, $P1_i$-$Pn_i$); and
a multiplicity of electronic readout systems for the photodiodes (P1-Pn, $P1_i$-$Pn_i$),
wherein a respective electronic readout system has a charge storage assembly comprising a plurality of individual charge storage devices that are interconnectable in cascading fashion, with the result that charges flowing in from an associated photodiode (P1-Pn, $P1_i$-$Pn_i$) successively fill the charge storage devices, and wherein the respective electronic readout system can be used to read the charges of the individual charge storage devices of the charge storage assembly and/or charges of subsets of the charge storage devices of the charge storage assembly.

2. A spectrometer according to claim 1, wherein charge storage devices that are situated towards the rear in a respective charge storage assembly in the cascade have a greater storage capacity than charge storage devices that are situated towards the front in the cascade.

3. A spectrometer according to claim 1, wherein the respective electronic readout system can be used to read the charges of subsets of the charge storage devices of the charge storage assembly, a first one of the subsets comprising only the frontmost charge storage device in the cascade, and a next one of the subsets comprising the charge storage device or devices of the preceding subset and additionally the next charge storage device towards the rear in the cascade, and so forth, and wherein the respective electronic readout system can furthermore be used to read the charge of all the charge storage devices of the charge storage assembly.

4. A spectrometer according to claim 1, wherein the excitation device is a spark source.

5. A spectrometer according to claim 1, wherein the photodiodes (P1-Pn, $P1_i$-$Pn_i$) are each connected to a measurement transfer gate and a drain transfer gate, wherein said transfer gates can be used in each case to establish and interrupt an electrical connection to the photodiode (P1-Pn, $P1_i$-$Pn_i$), a said electronic readout system is connected downstream of the measurement transfer gate, and the drain transfer gate is configured to drain charges from an associated photodiode (P1-Pn, $P1_i$-$Pn_i$).

6. A spectrometer according to claim 5, wherein an electronic control system is provided with which the transfer gates can be switched over, such that at a respective time only one of the transfer gates of a respective associated photodiode (P1-Pn, $P1_i$-$Pn_i$) establishes an electrical connection to the associated photodiode (P1-Pn, $P1_i$-$Pn_i$).

7. A spectrometer according to claim 5, wherein the photodiodes (P1-Pn, $P1_i$-$Pn_i$) are in each case also connected to one or more further measurement transfer gates, and wherein a said electronic readout system is connected downstream of a respective further measurement transfer gate.

8. A spectrometer according to claim 1, wherein the photodiodes (P1-Pn, $P1_i$-$Pn_i$) are arranged in such a way that an identical spectral component (S1-Sn) of the emitted, decomposed light is detectable in each case with a group (G1-Gn) of photodiodes ($P1_i$-$Pn_i$).

9. A spectrometer according to claim 8, wherein the photodiodes ($P1_i$-$Pn_i$) of a group (G1-Gn) overall have in each case a detection region having an extent LG in a longitudinal direction and QG in a transverse direction perpendicular to the longitudinal direction, with LG≥12*QG, wherein the photodiodes ($P1_i$-$Pn_i$) of the group (G1-Gn) divide the detection region in the longitudinal direction.

10. A spectrometer according to claim 1, further comprising an aperture device with which it is possible to shade some of the detection region of one or more photodiodes (P1-Pn, P1$_i$-Pn$_i$), in particular wherein the detection region has an extent LP in a longitudinal direction and QP in a transverse direction perpendicular to the longitudinal direction, with LP≥12*QP.

11. A method for operating an optical emission spectrometer according to claim 5, comprising:
- effecting a pulsed excitation of the sample to be examined using the excitation device such that a plurality of light emission phases (LI) and dark phases (DU) follow one another in alternation;
- establishing in each case with the measurement transfer gate an electrical connection to the associated photodiode (P1-Pn, P1$_i$-Pn$_i$) at least during part (T1, T2) of a respective light emission phase (LI); and
- establishing in each case with the drain transfer gate an electrical connection to the associated photodiode (P1-Pn, P1$_i$-Pn$_i$) in dark phases (DU).

12. A method according to claim 11, wherein in each case the measurement transfer gate establishes an electrical connection to the associated photodiode (P1-Pn, P1$_i$-Pn$_i$) only during a part (T2) of a respective light emission phase (LI), said part (T2) excluding an earliest time interval of the light emission phase (LI), in particular wherein an excitation of the sample is effected by way of spark discharge.

13. A method according to claim 11, wherein the photodiodes (P1-Pn, P1$_i$-Pn$_i$) are in each case also connected to one or more further measurement transfer gates, and a said electronic readout system is connected downstream of a respective further measurement transfer gate, and wherein the method further comprises:
- establishing in each case with the measurement transfer gate an electrical connection to the associated photodiode (P1-Pn, P1$_i$-Pn$_i$) only during part (T2) of a respective light emission phase;
- establishing in each case with one or more further measurement transfer gates an electrical connection to the associated photodiode (P1-Pn, P1$_i$-Pn$_i$) during one or more further parts (T1) of a respective light emission phase (LI); and
- establishing in each case with the drain transfer gate an electrical connection to the associated photodiode (P1-Pn, P1$_i$-Pn$_i$) in dark phases (DU).

14. A method according to claim 11, wherein the transfer gates of all photodiodes (P1-Pn, P1$_i$-Pn$_i$) are synchronously switched over during the measurement of the sample.

15. A method of operating an optical emission spectrometer according to claim 1, wherein a sample is measured with the spectrometer, said sample having spectral lines in the detected light which differ in terms of their integrated intensity by at least a factor of $10^5$.

* * * * *